Dec. 2, 1930.                    H. F. HITNER                    1,783,473
              PROCESS AND APPARATUS FOR REGULATING THE TEMPERATURE
                        OF GLASS WITHDRAWN FROM A TANK
                              Filed Feb. 4, 1929
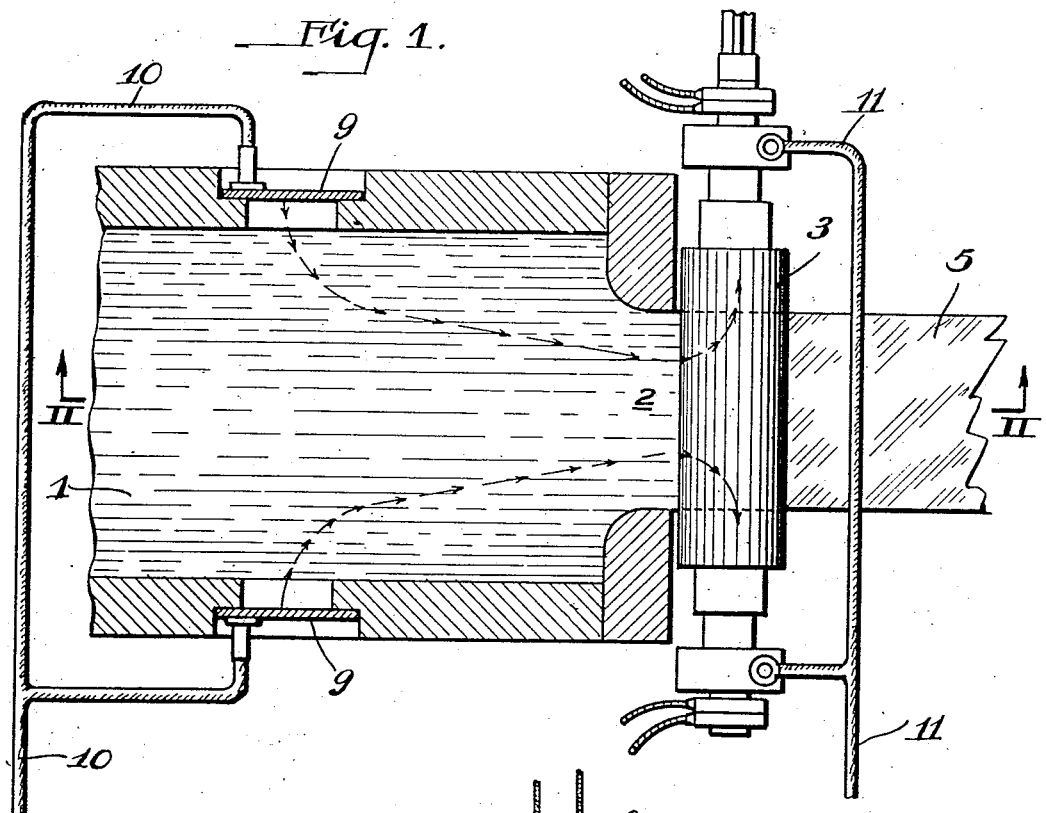
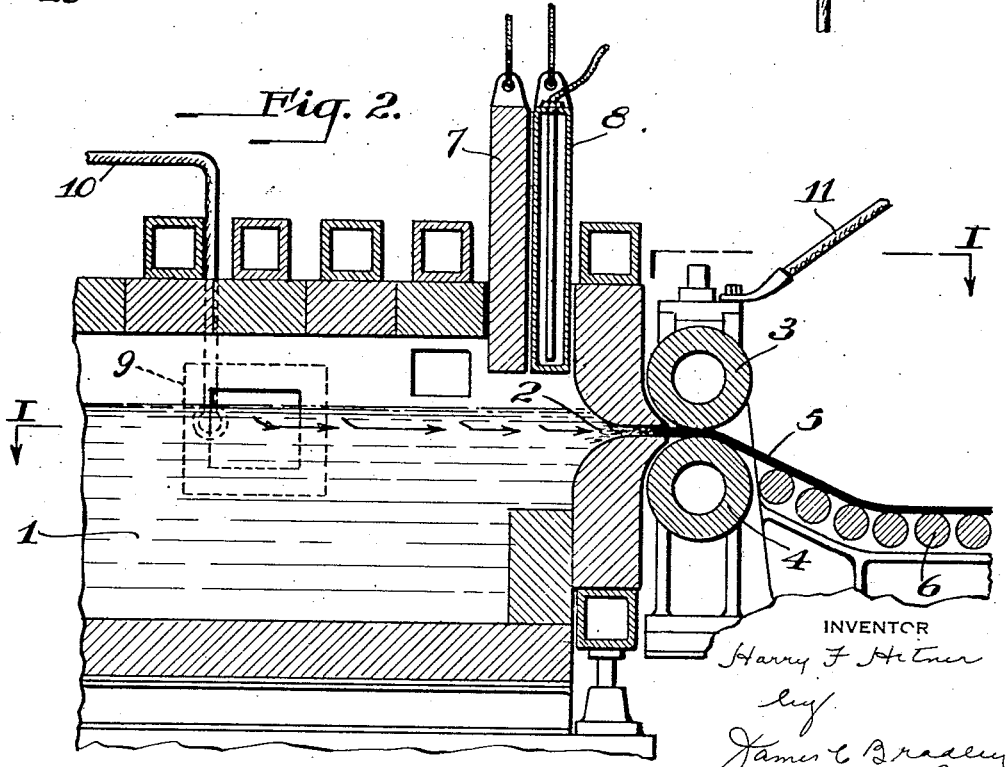

Patented Dec. 2, 1930

1,783,473

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

PROCESS AND APPARATUS FOR REGULATING THE TEMPERATURE OF GLASS WITHDRAWN FROM A TANK

Application filed February 4, 1929. Serial No. 337,296.

The invention relates to a process and apparatus for regulating the temperature of a stream of glass withdrawn from a glass melting tank and more particularly to such a process and apparatus as applied to the production of a continuous sheet of glass from a melting tank and employing a pair of rolls which size or dimension the sheet. The invention has for its objects the provision of means whereby the temperature of the glass in the outflowing stream of glass may be easily and exacly regulated to the end that its quality may be improved and the amount of ream and blister reduced. A further object is the provision of means whereby the fluidity of the glass at the outlet slot and to the rear thereof may be increased to suit requirements and the cold glass quickly fused at this point after a shut down for repairs. One embodiment of the invention is illustrated in the accompanying drawings, wherein:

Figure 1 is a horizontal section through a tank equipped in accordance with the invention, such section being taken on the line I—I of Fig. 2. And Fig. 2 is a vertical section on the line II—II of Fig. 1.

Referring to the drawings, 1 is the delivery end of a glass melting tank having an outlet slot 2 in its front wall through which a stream of glass is discharged to the pass of the water cooled sizing rolls 3 and 4, such rolls being suitably driven by means not shown. The sheet 5 which is formed passes over the rolls 6 and into a roller leer which is not shown. In order to cut off the flow of glass, the gates 7 and 8 are provided, supported from above, the gate 7 being of refractory material, while the gate 8 is hollow and is cooled by a flow of water therethrough when the gate is in lowered position.

Located in the side walls of the furnace are the electrode plates 9, 9 connected to the electric supply main 10. The plates are preferably of a chromium iron alloy containing about twenty-five per cent of chromium, such alloy being highly refractory and capable of use without discoloring the glass. A second electric supply main 11 is connected to the housing of the rolls 3 and 4. Current is preferably supplied to the mains 10 and 11 from a single phase alternating current generator. In operation, current flows from the rolls 3 and 4 back through the stream of glass in the slot 2 and through the body of glass in the tank to the electrodes 9, 9. The passage of this current raises the temperature of the glass stream having its outlet through the slot 2 and also increases slightly the temperature of the body of glass from which the stream of glass is supplied. Means are thus provided for regulating the temperature and fluidity of the outflowing glass, the amount of current being increased or decreased as conditions require. By the proper regulation of the temperature and fluidity of the outflowing glass stream and the body of glass from which the stream is supplied, the formation of ream and blister may be reduced to a minimum. The supply of current is also useful after a shut down of the furnace and a consequent hardening or freezing of the glass in and adjacent to the outlet slot and incident to the lowering of one of the gates 7 and 8. After the raising of the gates, and the partial heating of the chilled glass from the molten glass adjacent the gates, a flow of electric current from the sizing rolls 3 and 4 to the electrodes 9, 9 will quickly complete the melting of the stiff glass, so that the operation of the furnace may be initiated with a minimum loss of time.

What I claim is:

1. A method of raising the temperature of a stream of glass flowing from a tank between forming rolls which consists in passing an electric current from the rolls through the stream of glass and through the body of molten glass in the tank.

2. The combination with a tank having an outlet opening and a pair of sizing rolls in opposition to said opening, of means for heating the stream of glass passing to the rolls, comprising means for causing a flow of electric current from the rolls through the stream of glass, said means including a connection from a supply of current to the rolls, an electrode making contact with the body of molten glass in the tank, and a second connection from said supply of current to the electrode.

In testimony whereof, I have hereunto subscribed my name this 3rd day of January, 1929.

HARRY F. HITNER.